United States Patent
Koslov

(10) Patent No.: US 7,127,019 B2
(45) Date of Patent: Oct. 24, 2006

(54) METHODS AND APPARATUS FOR IMPLEMENTING MULTI-TONE RECEIVERS

(75) Inventor: Joshua L. Koslov, Hopewell, NJ (US)

(73) Assignee: Hitachi, Ltd., Tokyo (JP)

( * ) Notice: Subject to any disclaimer, the term of this patent is extended or adjusted under 35 U.S.C. 154(b) by 763 days.

(21) Appl. No.: 09/886,591

(22) Filed: Jun. 21, 2001

(65) Prior Publication Data

US 2002/0196880 A1 Dec. 26, 2002

(51) Int. Cl.
*H04L 7/00* (2006.01)
*H03D 1/04* (2006.01)

(52) U.S. Cl. .................. 375/371; 375/346

(58) Field of Classification Search ........... 375/254, 375/285, 326, 328, 346, 354, 355, 349, 371, 375/373; 370/206, 208, 516
See application file for complete search history.

(56) References Cited

U.S. PATENT DOCUMENTS

| | | | |
|---|---|---|---|
| 5,115,452 A * | 5/1992 | Cupo | 375/232 |
| 6,034,993 A * | 3/2000 | Norrell et al. | 375/232 |
| 6,246,717 B1 * | 6/2001 | Chen et al. | 375/226 |
| 6,452,987 B1 * | 9/2002 | Larsson et al. | 375/345 |
| 6,570,917 B1 * | 5/2003 | Lai et al. | 375/232 |
| 6,608,863 B1 * | 8/2003 | Onizawa et al. | 375/232 |
| 6,816,548 B1 * | 11/2004 | Shiue et al. | 375/233 |

\* cited by examiner

*Primary Examiner*—Khanh Tran
*Assistant Examiner*—Sam K. Ahn
(74) *Attorney, Agent, or Firm*—Michael P. Straub; Straub & Pokotylo

(57) ABSTRACT

Methods and apparatus for reducing phase jitter in a multi-tone, e.g., OFDM, receiver are described. A jitter compensation filter is used to process a received signal following timing recovery and/or channel compensation to reduce and/or eliminate the effect of phase jitter. Jitter compensation filter tap weights are updated after filtering the received signal based on one or more signal error measurements. The same received signal is filtered using the updated filter, and error measurements generated from the filtered signal are used to once again update the filter's tap weights. After a fixed number of filter update cycles and/or some other filter updating stop criterion being satisfied, the filter updating process is stopped and the filtered signal is used, e.g., supplied to additional receiver circuitry.

21 Claims, 15 Drawing Sheets

METHODS AND APPARATUS FOR IMPLEMENTING MULTI-TONE RECEIVERS

FIELD OF THE INVENTION

The present invention relates to communications systems and, more particular, to methods and apparatus for implementing multi-tone receivers, e.g., orthogonal frequency division multiplexed (OFDM) signal receivers.

BACKGROUND

As people become more mobile, the number of portable devices, e.g., notebook computers, personal data assistants, cell phones, etc., continues to increase. The use of wireless communications techniques enables modern portable devices to receive and transmit data from various locations.

With recent advances in the Internet and other data services, users of portable devices are beginning to feel a need to receive and transmit ever increasing amounts of data using wireless communications techniques.

In wireless communications a data signal, e.g., a series of symbols, is frequently modulated on a carrier signal, e.g., a carrier tone, having a particular carrier or tone frequency. In order to increase the amount of data that can be transmitted in a given period of time, a plurality of different carriers may be used to transmit data, e.g., symbols, in parallel. This results in the broadcasting of what is known as a multi-tone signal. When multi-tone signals are used, the bandwidth of the system becomes a function of the number of carrier signals in the multi-tone signal. An OFDM signal is one particular type of multi-tone signal.

As the result of the transmission of a signal through a communications channel and the processing of the received signal, e.g., by a tuner and other circuitry, the transmitted signal may be distorted. For example, the communications channel may introduce amplitude and/or phase distortions. Tuners and other receiver circuitry may introduce time varying phase distortions sometimes call phase jitter. Such signal distortions can make it difficult to recover transmitted data, e.g., symbols, from a received signal.

Communications channel distortions are difficult to avoid particularly in the case of over the air transmissions. Accordingly, attempts at addressing communications channel distortions have focused primarily on compensating for the introduced distortions at some point in the receiver.

Phase jitter, in contrast to communications channel distortions, can be reduced or eliminated by using high quality circuits in the receiver. Accordingly, attempts at addressing phase jitter have been focused on using better quality tuners and other circuits in a receiver than those which introduce unacceptable amounts of phase jitter.

While reducing phase jitter by using high quality receiver components can be effective, it has the disadvantage of requiring the use of high quality components which are usually more expensive than lower quality components, i.e., the components which introduce more phase jitter. In consumer applications, cost is often a major concern. Accordingly, from a cost perspective, in many applications the use of high quality tuners and other comparatively expensive circuitry can be undesirable.

In view of the above discussion, it should be apparent that there is a need for methods and apparatus for increasing the amount of phase jitter which can be tolerated in a receiver, e.g., a multi-tone signal receiver, thereby facilitating the use of relatively inexpensive tuners and/or other receiver circuitry. In addition, from a cost perspective, it is desirable that at least some methods and apparatus for enhancing a receiver's tolerance of phase jitter be relatively straight forward and inexpensive to implement.

SUMMARY OF THE INVENTION

The present invention is directed to methods and apparatus for implementing multi-tone receiver circuitry, e.g., OFDM receivers. In particular, the invention is directed to reducing and/or eliminating the effect of phase jitter in a multi-tone receiver.

In accordance with the present invention, jitter compensation filtering is performed on a multi-tone signal, e.g., representing transmitted symbols, to reduce and/or eliminate the effect of phase jitter on the signal. The filtering operation may be performed following timing recovery and/or channel compensation processing operations, e.g., prior to demodulation.

To perform the jitter compensation filtering, a multi-tap filter, e.g., a programmable FIR filter, is used to process the received signal. The filter's tap weights are updated using at least one error estimation and/or error measurement technique. The received signal is reprocessed and the filter coefficients updated again. The filtering and filter updating steps are performed iteratively, e.g., for a preselected number of iterations and/or until some filter updating stop criterion are satisfied, e.g., the filtered signal ceases to improve from the use of the updated filter.

In one exemplary embodiment, the jitter compensation filter operates on a block of data. The block of data may include samples representing the symbols received on different carrier tones during the same symbol time. After a block of data is processed by the jitter compensation filter, the filter's tap weights are reset to their initial values before a new block of data is processed. The resetting of the filter tap weights reflects the fact that phase jitter may not correlate from block to block due to the time varying nature of the jitter.

Decision directed error measurements, pilot directed error measurements, and other non-decision directed error measurement techniques, e.g., constant modulus error measurement techniques are applied to the filtered signal to generate an error signal which can be used to update the jitter compensation filter's tap weights. The particular error measurement technique used at any given point of time is selected as a function of, e.g., whether a pilot symbol is being processed and/or whether a mean squared error generated from the decision directed error estimate is below a preselected threshold indicating that the decision directed error may be beneficial in updating the filter tap values.

The jitter compensation techniques of the present invention allow inexpensive tuners and/or other receiver circuitry, having otherwise excessive phase noise, to be used in a multi-tone, e.g., OFDM, receiver.

Additional features, embodiments and benefits of the methods and apparatus of the present will be discussed below in the detailed description that follows.

DETAILED DESCRIPTION

The present invention relates to methods and apparatus for implementing a multi-tone signal receiver, e.g., an OFDM signal receiver. In accordance with various embodiments of the present invention, jitter compensation circuitry, e.g., a jitter compensation filter, is included as part of the signal receiver to increase the receiver's jitter tolerance as compared to receivers without such jitter compensation circuitry.

Figure 1:
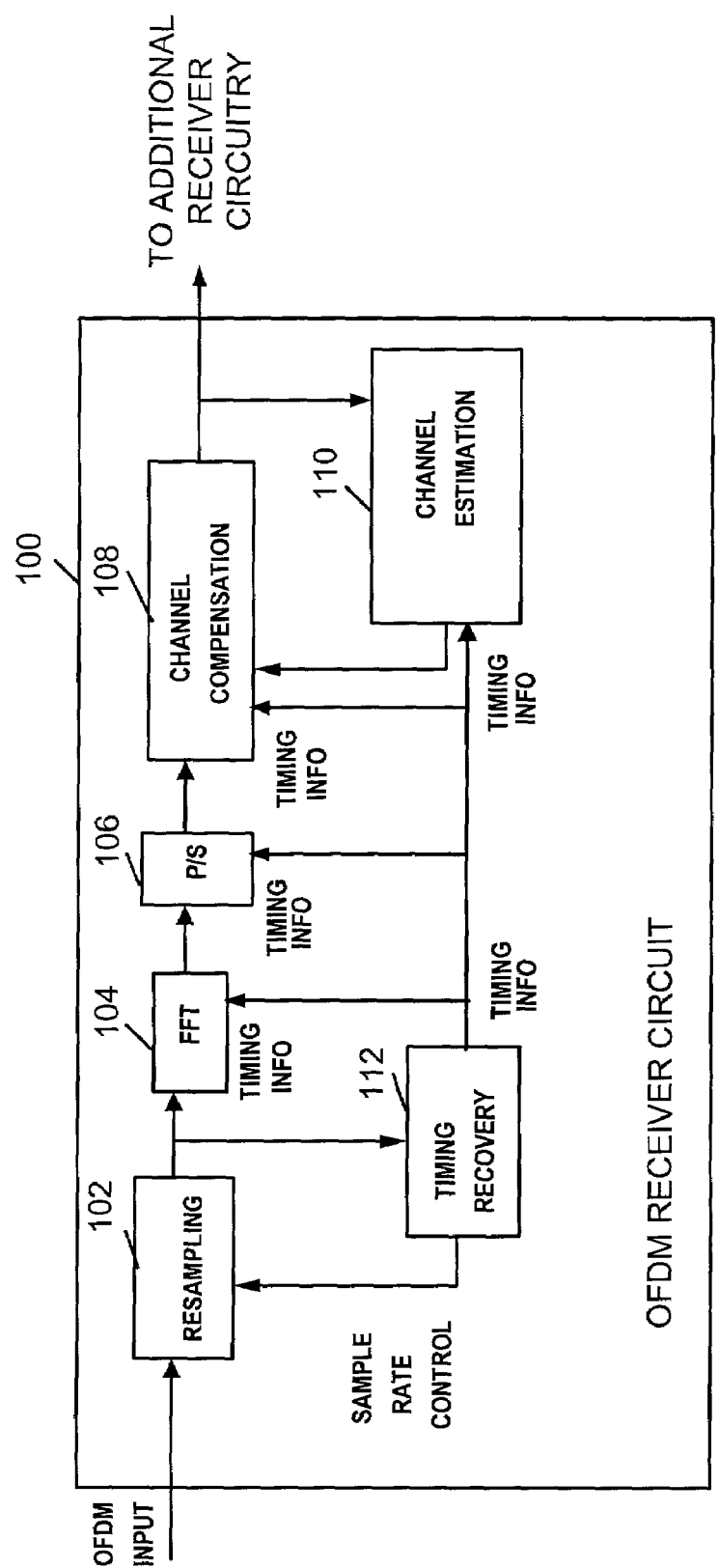
FIG. 1 illustrates an OFDM receiver circuit.

FIG. 1 shows a basic block diagram of an OFDM receiver circuit 100 which can be used as part of an OFDM demodulator. The receiver circuit 100 includes a resampling circuit 102 which may be implemented, e.g., using an A/D converter, a fast fourier transform (FFT) circuit 104, a parallel to serial converter (P/S) 106, a channel compensation circuit 108, a channel estimation circuit 110 and a timing recovery circuit 112 coupled together as illustrated in FIG. 1. The various circuits illustrated in FIG. 1 can be implemented using known techniques. The resampling circuit 102 is responsible for sampling the received OFDM signal and generating digital samples therefrom as a function of signal timing information obtained from timing recovery circuit 112. The digital samples are supplied to the FFT circuit 104 which performs a fast Fourier transform operation thereon. The digital samples corresponding to each sub-carrier signal of the received OFDM signal are supplied in parallel to the parallel to serial converter circuit 106. The circuit 106 converts the parallel input into a serial data stream which is supplied to the channel compensation circuit 108. The channel compensation circuit 108 performs one or more signal processing operations, e.g., filtering operations, designed to correct for signal distortions introduced by the communications channel from which the OFDM signal is received. The channel compensation circuit 108 uses channel information obtained from channel estimation circuit 110 when performing channel compensation operations.

The OFDM receiver circuit 100 may, and in one embodiment is, followed by demodulator circuitry including circuits for performing demapping, decoding and forward-error-correction functions.

Figure 2:
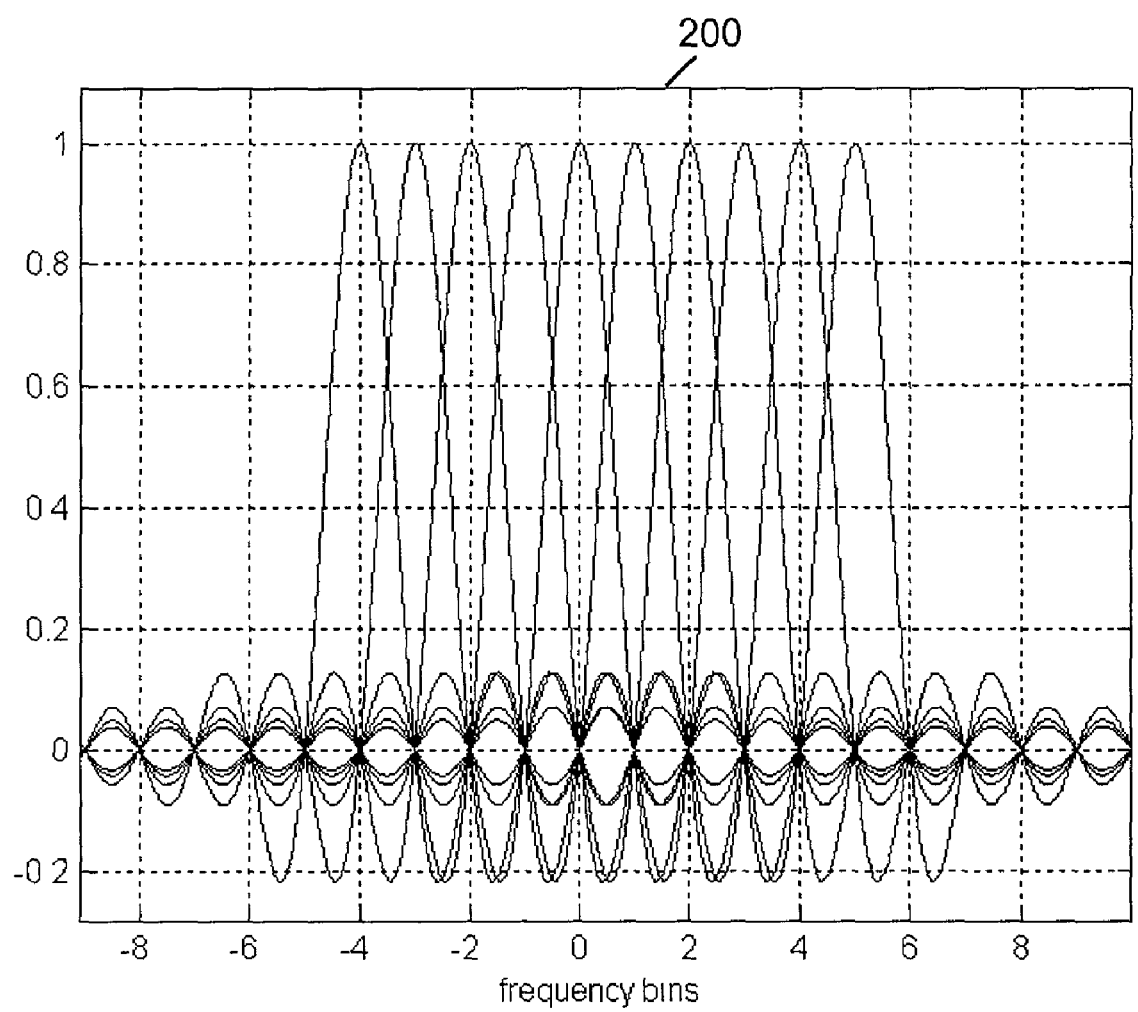
FIG. 2 illustrates an ideal OFDM spectrum.
Figure 3:
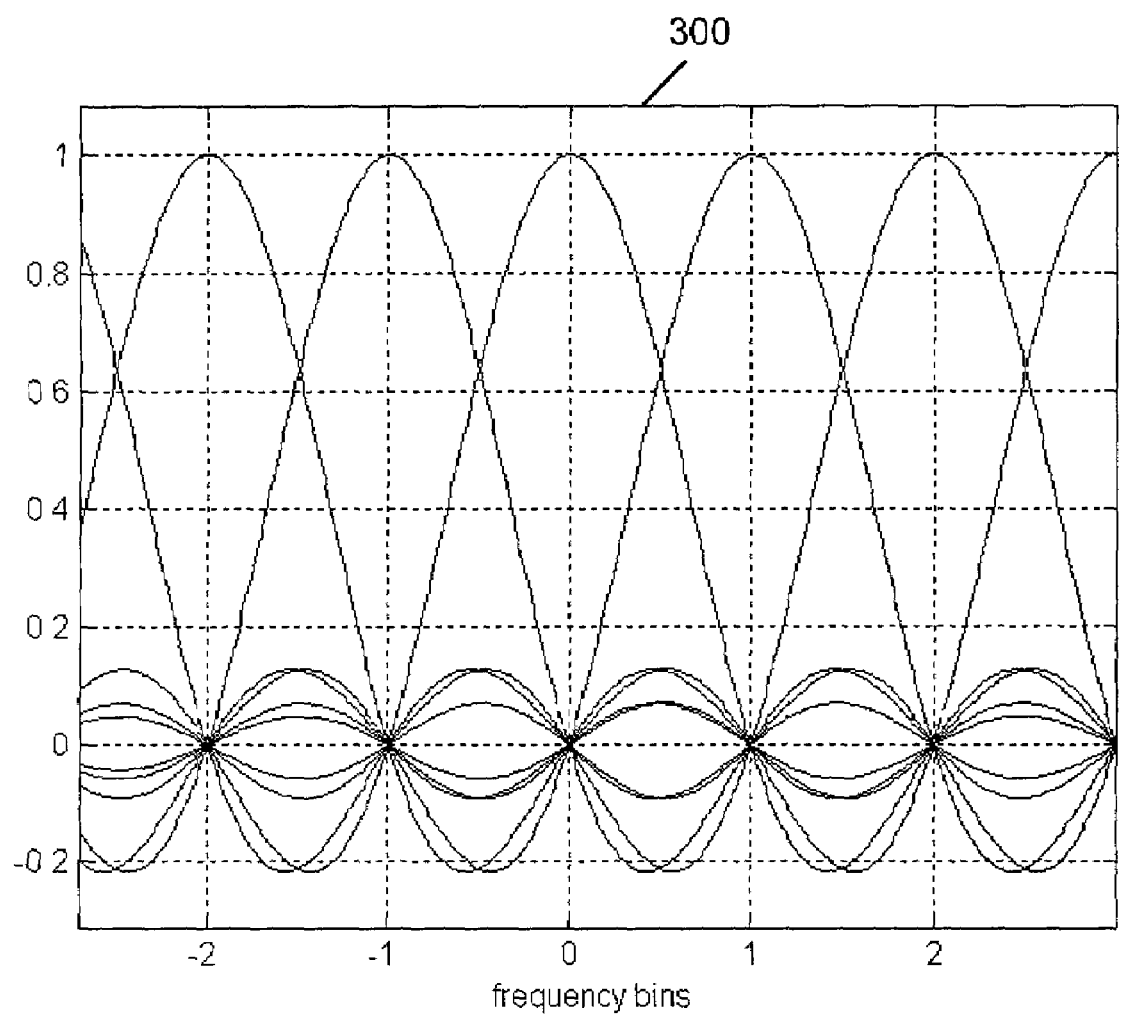
FIG. 3 is an expanded view of a portion of the ideal OFDM spectrum illustrated in FIG. 2.

FIG. 2 is a diagram 200 an exemplary ideal OFDM spectrum, which comprises a number of carriers. The vertical axis in FIG. 2 is a function of signal energy while the horizontal axis is a function of frequency. OFDM carrier tones are spaced one horizontal integer unit apart in the FIG. 2 illustration. FIG. 3 is a diagram 300 which provides an expanded illustration of a portion of the OFDM spectrum shown in FIG. 2. In FIG. 3 it can be seen that the energy of each OFDM carrier passes through zero at the surrounding carriers' center positions.

Figure 4:
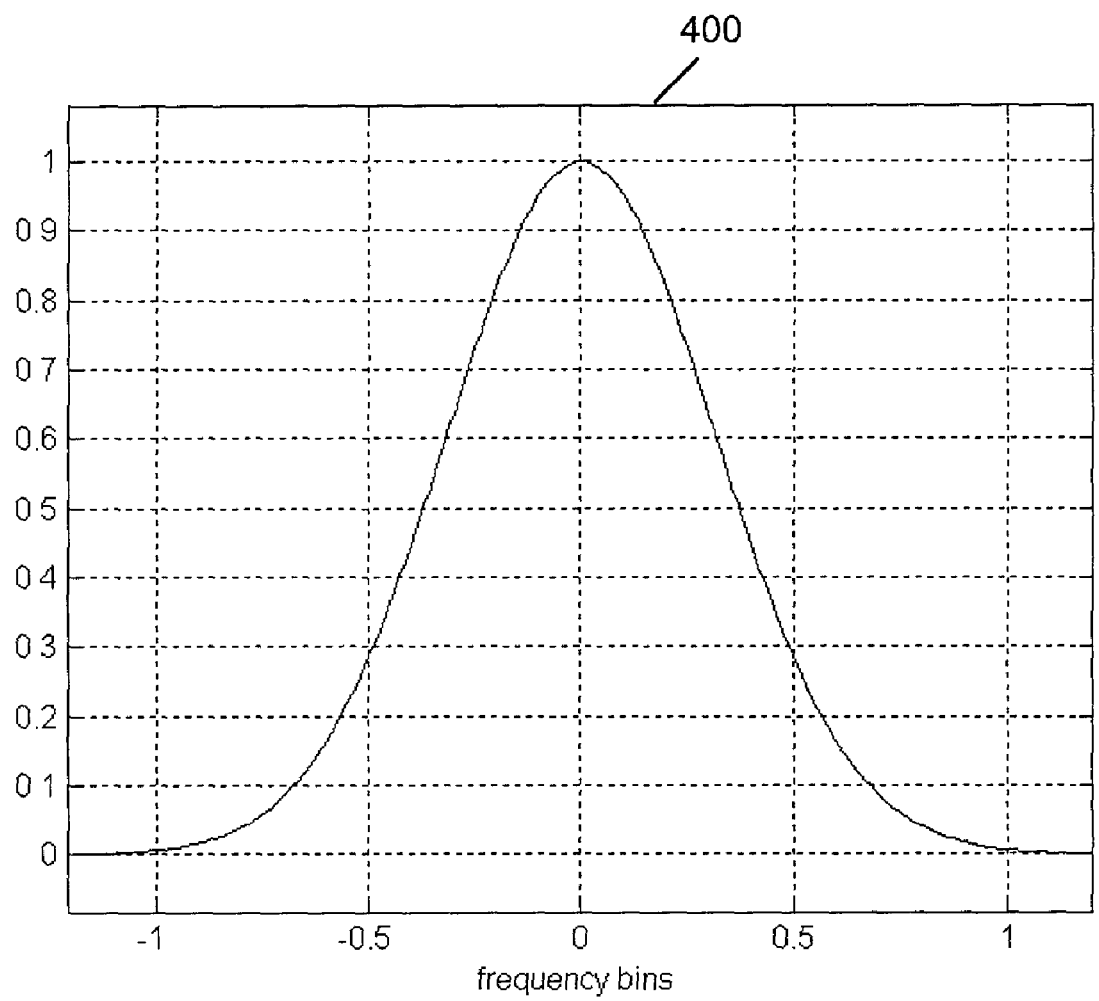
FIG. 4 illustrates an idealized jitter spectrum which may be encountered when processing an OFDM signal.

FIG. 4 is a diagram 400 showing an exemplary jitter spectrum. If a local oscillator used for frequency conversion in the OFDM transmitter or receiver is contaminated by phase noise, it will no longer be a perfect sine wave, and therefore will have some finite spectral width resulting in a spectrum such as that illustrated in FIG. 4. The phase noise contaminated signal in FIG. 4 is in contrast to the impulse function that would occur if a perfect sine wave were plotted on the FIG. 4 chart. When the output of an oscillator having a signal such as that shown in FIG. 4 is mixed, or multiplied, with the OFDM spectrum, it has the effect of convolution in the frequency domain.

Figure 5:
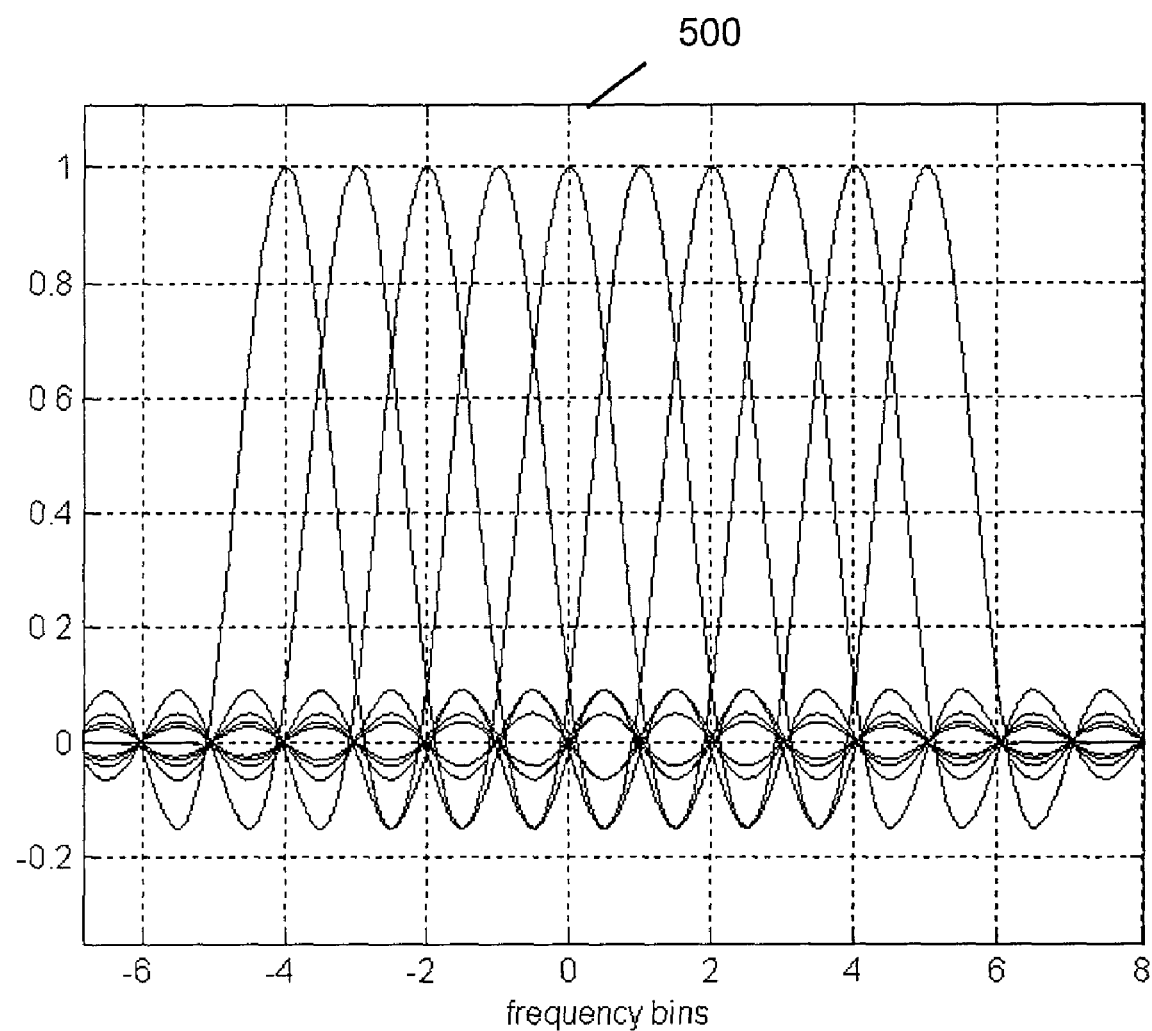
FIG. 5 illustrates the effect of the jitter illustrated in FIG. 4 on an OFDM spectrum such as that shown in FIG. 2.
Figure 6:
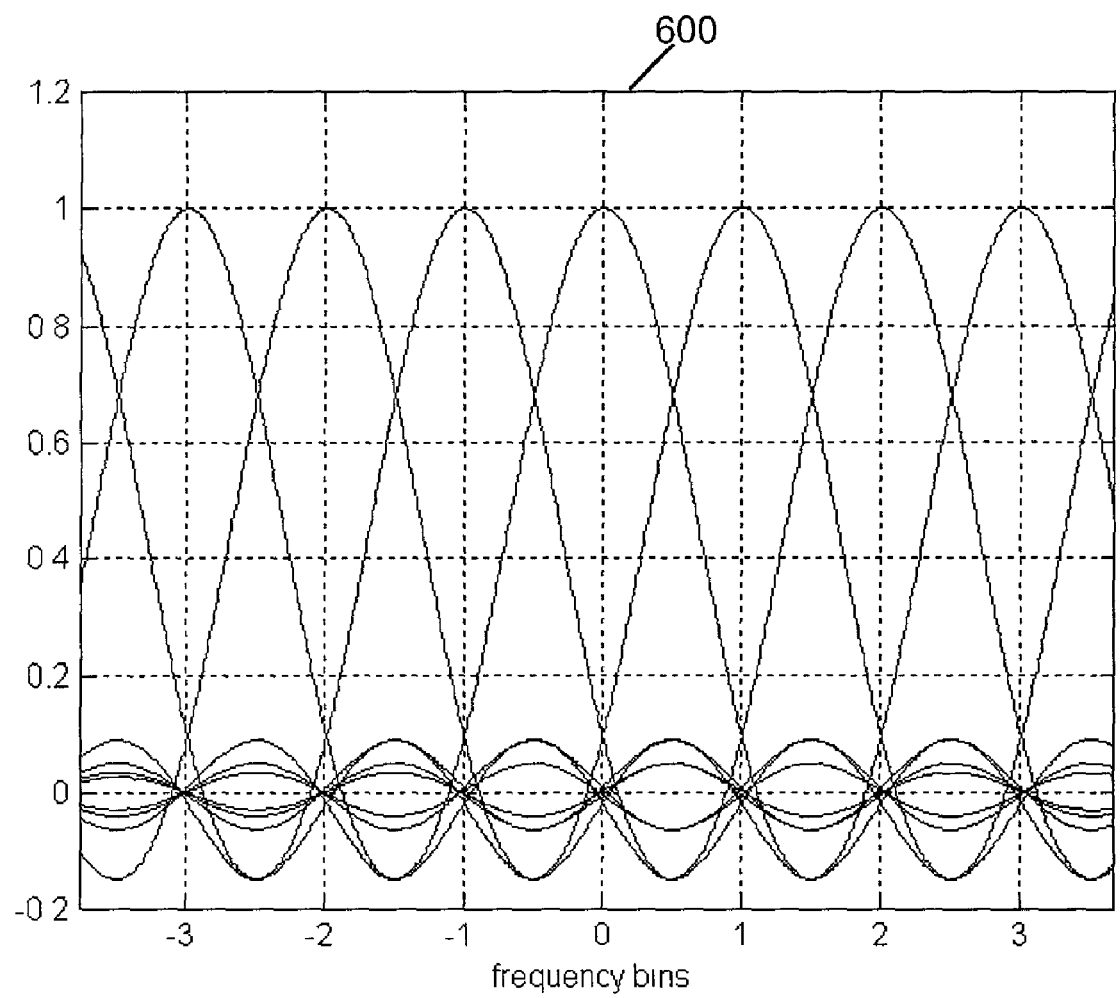
FIG. 6 is an expanded view of a portion of the jitter affected OFDM spectrum illustrated in FIG. 5.

FIG. 5 is a diagram 500 showing the convolution of the exemplary jitter spectrum shown in FIG. 4 with the exemplary ideal OFDM spectrum illustrated in FIG. 1. FIG. 6 is a diagram 600 which shows an expansion of a portion of the spectrum illustrated in FIG. 5. In FIG. 6 it can be clearly seen that the energy of each carrier now does not pass through zero at the surrounding carriers' center positions as in the case of the ideal OFDM spectrum shown in FIGS. 2 and 3. In FIG. 6, the carriers are no longer purely orthogonal, thereby resulting in inter-carrier interference.

Figure 7:
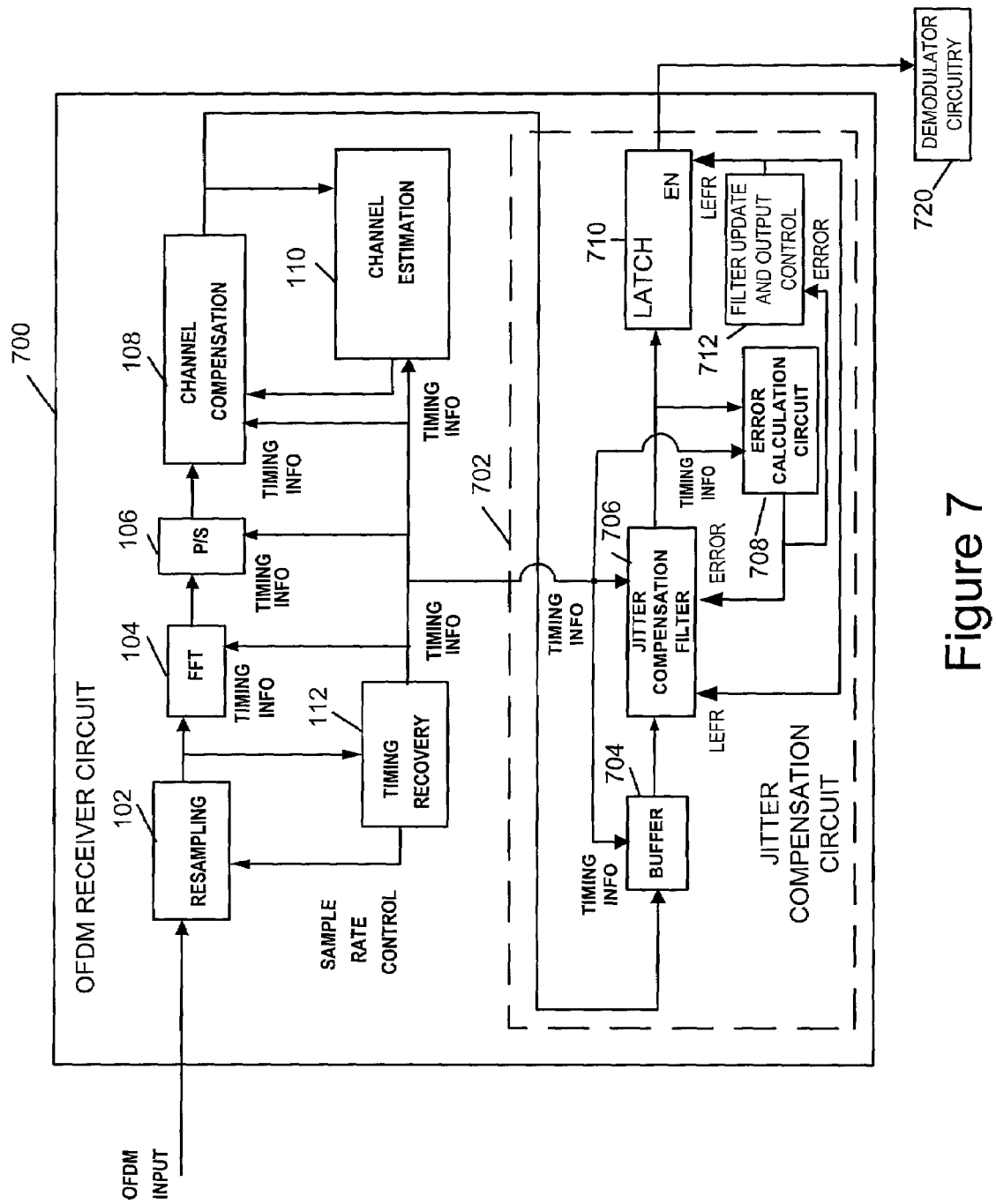
FIG. 7 illustrates an OFDM receiver circuit which includes jitter compensation circuitry in accordance with the present invention.

FIG. 7 illustrates an OFDM receiver circuit 700 implemented in accordance with the invention. The circuit 700 includes a resampling circuit 102, FFT circuit 104, P/S circuit 106, channel compensation circuit 108, channel estimation circuit 110, and a timing recovery circuit 112 which are the same as, or similar to, the like named circuits described above in regard to FIG. 1. In addition to these elements, the OFDM receiver circuit 700 includes a jitter compensation circuit 702 implemented in accordance with the present invention. The jitter compensation circuit 702 receives as its input, the output of the channel compensation circuit 108, e.g., a block of samples upon which channel compensation has been performed. It also receives timing information from the timing recovery circuit 112.

The jitter compensation circuit 702 includes a buffer 704, a jitter compensation filter 706, and an error calculation circuit 708 each of which receives timing information from timing recovery circuit 112. In addition the compensation circuit 702 includes a filter update and output control circuit 712 and a latch 710. The latch 710 has an enable input which is enabled by the filter update and output control circuit 712 when it determines that the filtering of the signal, e.g., block of samples received from the channel compensation circuit 108 during a symbol time period has undergone sufficient filtering. The output of the latch 710 serves as the output of the jitter compensation circuit 702 and is supplied, e.g., to subsequent demodulator circuitry.

The buffer 704 is used to receive and hold the output of the channel estimation compensation circuit 108 so that it can be repeatedly processed by the jitter compensation filter 706 prior to being output by the OFDM receiver circuit 700.

The jitter compensation filter 706 is used to reduce and/or remove intercarrier interference caused by random jitter, e.g., prior to demodulation. The jitter compensation filter 706 is particularly well suited to reducing and/or eliminating jitter caused by, e.g., tuner phase noise. In order to allow the jitter compensation filter 702 to process a block of samples multiple times, the jitter compensation filter operates at a clock rate which is a multiple of the sampling rate used to initially generate the digital signal being processed.

The error calculation circuit 708, is coupled to, and receives as its input, the filtered samples output by the jitter compensation filter 706. The error calculation circuit 708 is used to calculate a filter coefficient update signal, e.g., in the form of an error signal, used to adjust the jitter compensation filter's tap weights. After the filter taps are updated by the error signal, the data stored in the buffer 704 is filtered again. In this manner, the filter coefficients corresponding to the jitter compensation filter's taps are updated as part of an iterative process.

A fixed number of iterations, (e.g., filtering, error calculation and filter update cycles) may be set, or the iterations may be allowed to proceed until the system is deemed to have converged, e.g., at a stable jitter compensation filter output result. The filter update and output control circuit 712 is responsible for determining, e.g., from the error signal and/or clock signals, when the selected filter output criteria have been satisfied.

Because phase jitter is generally uncorrelated from OFDM symbol to OFDM symbol, e.g., from FFT block to FFT block, in the exemplary embodiment a new filter solution is generated for each input block. In a case where each symbol period is used to transmit a separate FFT block, the jitter compensation filter tap weights would be reset each symbol period. The jitter compensation filter 706 acts as an equalizer. The filter's taps may be set to an initial solution of, e.g., a unity center tap surrounded by zero taps, at the beginning of processing of each block of FFT values. This can be done by way of a reset signal, e.g., a latch enable and filter reset (LEFR) signal, generated by the filter update and output control circuit 712. The LEFR signal used to reset the filter taps to their initial values is also used to enable the output latch 710.

The jitter compensation filter 706 can be trained for a fixed number of iterations or the decision-directed error or other metric can be examined to determine when the compensation filter taps have adequately converged at which point the latch 710 is enabled and the jitter compensation tap weights reset for processing the next block of symbol values. The filter update and output control circuit 712 is responsible for performing this function. The same signal, LEFR, which stands for Latch Enable and Filter Reset, can be used to enable the latch 710 and reset the tap weights in the jitter compensation filter 706 to preselected, e.g., initial, values. In one embodiment, the output control circuit 712 enables the LEFR signal after a preselected number of jitter compensation filter update cycles. In another embodiment, the LEFR signal is generated after the filter update and output control circuit determines from the error calculation circuit error output that the error estimate has ceased to improve but is improving by less than a preselected threshold amount with each iteration. After its assertion the filter update and output control circuit de-asserts the LEFR signal so that filter updating starting from the initial values filter tap weight values may occur once again.

The jitter compensation filter 706 can, and in some embodiments is, implemented as a finite impulse response (FIR) filter with adaptable tap weights, sometimes called filter coefficients. An exemplary jitter compensation filter 706 suitable for use in the system 700 is shown in FIG. 8.

Figure 8:
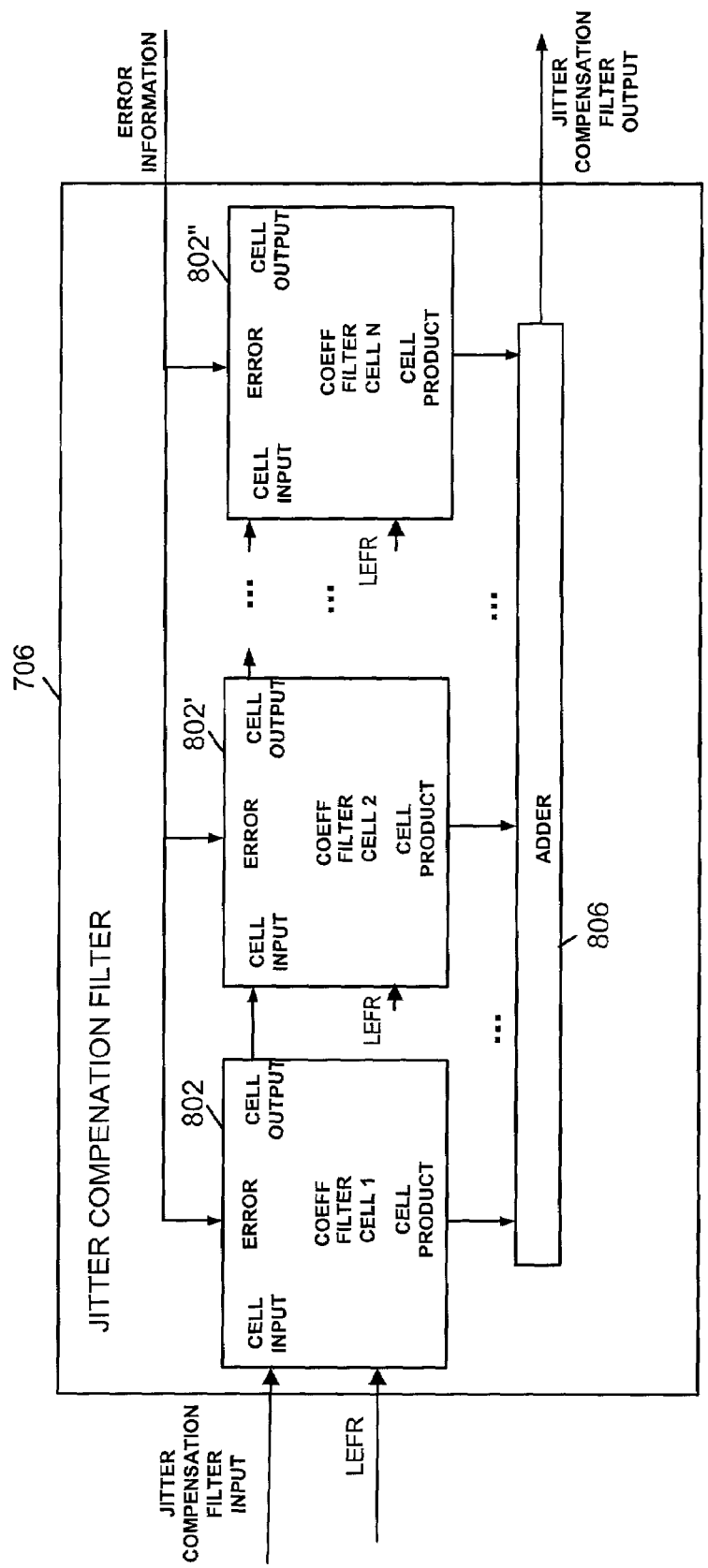
FIG. 8 illustrates an exemplary jitter compensation filter which can be used in the OFDM receiver circuit shown in FIG. 7.

In FIG. 8, the filter 706 is shown as having an adder 806 and a plurality of coefficient cells 802, 802' 802" arranged to form a sequence of N filter cells, each cell corresponds to one filter tap. The first filter cell, 802, in the sequence of N filter cells receives as its input the jitter compensation filter output. A cell output of the first filter cell 802 is coupled to the cell input of the next filter cell 802', in the sequence of N filter cells. Thus, with the exception of the first filter cell 802, the Nth filter cell in the sequence receives its cell input from the cell output of the preceding (N-1) filter cell. The output of the last filter cell (Nth) filter cell 802" in the sequence of N filter cells goes unused since there is no subsequent filter cell.

Each of the filter cells also receives, as an input, error information generated by the error calculation circuit 708. The error information may be, e.g., tap weight update information, which is used by the filter cells to update their internal tap weight or weights. The tap weights may be reset to an initial value after processing the block of data corresponding to a symbol period by way of the LEFR signal which is used as a reset signal.

Each of the N filter cells 802, 802', 802" generates a cell product. The cell product from each filter cell is supplied as an input to the adder 806. The adder 806 sums the cell products output by each of the N coefficient cells to generate the jitter compensation filter's output signal. Thus, the output of the jitter compensation filter 706 is the summation of the outputs of the individual coefficient cells. As will be discussed below, the jitter compensation filter output signal is used by the error calculation circuit 708 to generate the error information, used to update the jitter compensation filter's tap weights to be used in the next iteration of the filtering process.

Figure 9:
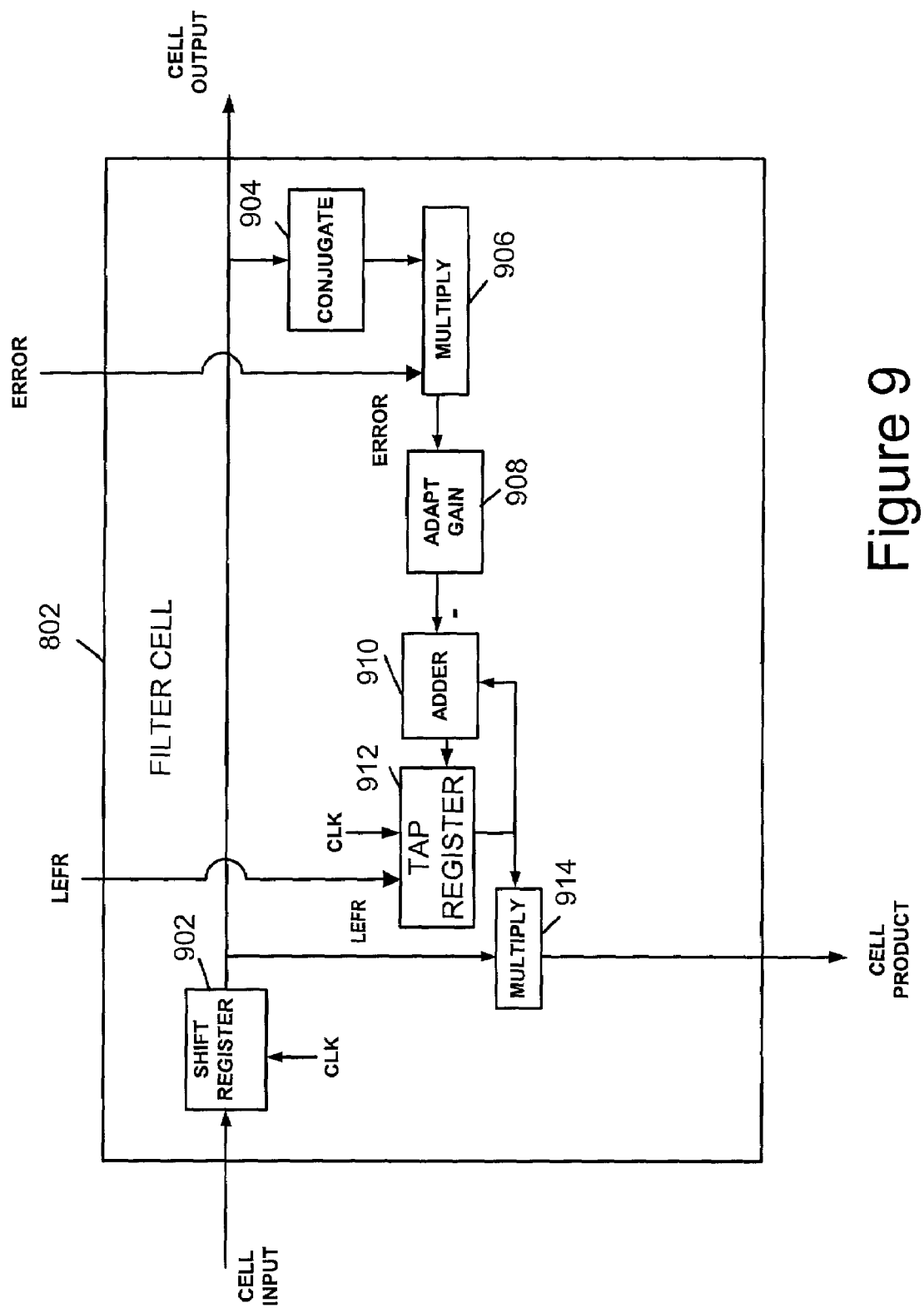
FIG. 9 illustrates an exemplary filter cell which may be used to implement the jitter compensation filter of FIG. 8.

A first exemplary jitter compensation coefficient filter cell 802 is shown in FIG. 9. The filter cell 802 comprises a register 902, conjugate circuit 904, a first multiplier 906, adaptive gain circuit 908, adder 910, tap register 912 and a second multiplier 914. The tap register 912 stores the filter coefficient, also sometimes called tap weight, used by the filter cell 802.

The shift register 902 is a delay element that serves as part of the general delay-line structure of the overall FIR jitter compensation filter 706. The output of the register 902 is multiplied by the coefficient value stored in tap register 912 thereby producing the output, e.g., cell product, of the coefficient cell 802.

The tap value is updated after each filtering operation as a function of the received error signal (ERROR). In the FIG. 9 embodiment, the multiplier 906 multiplies the received error signal with the conjugate of the value output by the shift register 902. The multiplier output value is then scaled by gain circuit 908 by an amount set within the circuit 908. The scaled multiplier output is supplied to a subtracting input of adder 910 which further receives, at an adding input, the current value stored in tap register 912. The resulting corrected filter coefficient value, generated by subtracting the scaled multiplier output value from the current filter coefficient value, is stored in tap register 912 in time to be used during the next filtering operation.

In the above described manner, the value of tap stored in register 912, is updated by subtracting, through an adder 910 a correction signal which is the product, scaled by an adaptation gain, of the error signal received from the error calculation block and the conjugate of the data stored in shift register 902. This approach represents a least-mean-square (LMS) update technique. Other tap weight updating mechanisms may be employed instead of, or in addition to, the described LMS update technique.

Figure 10:
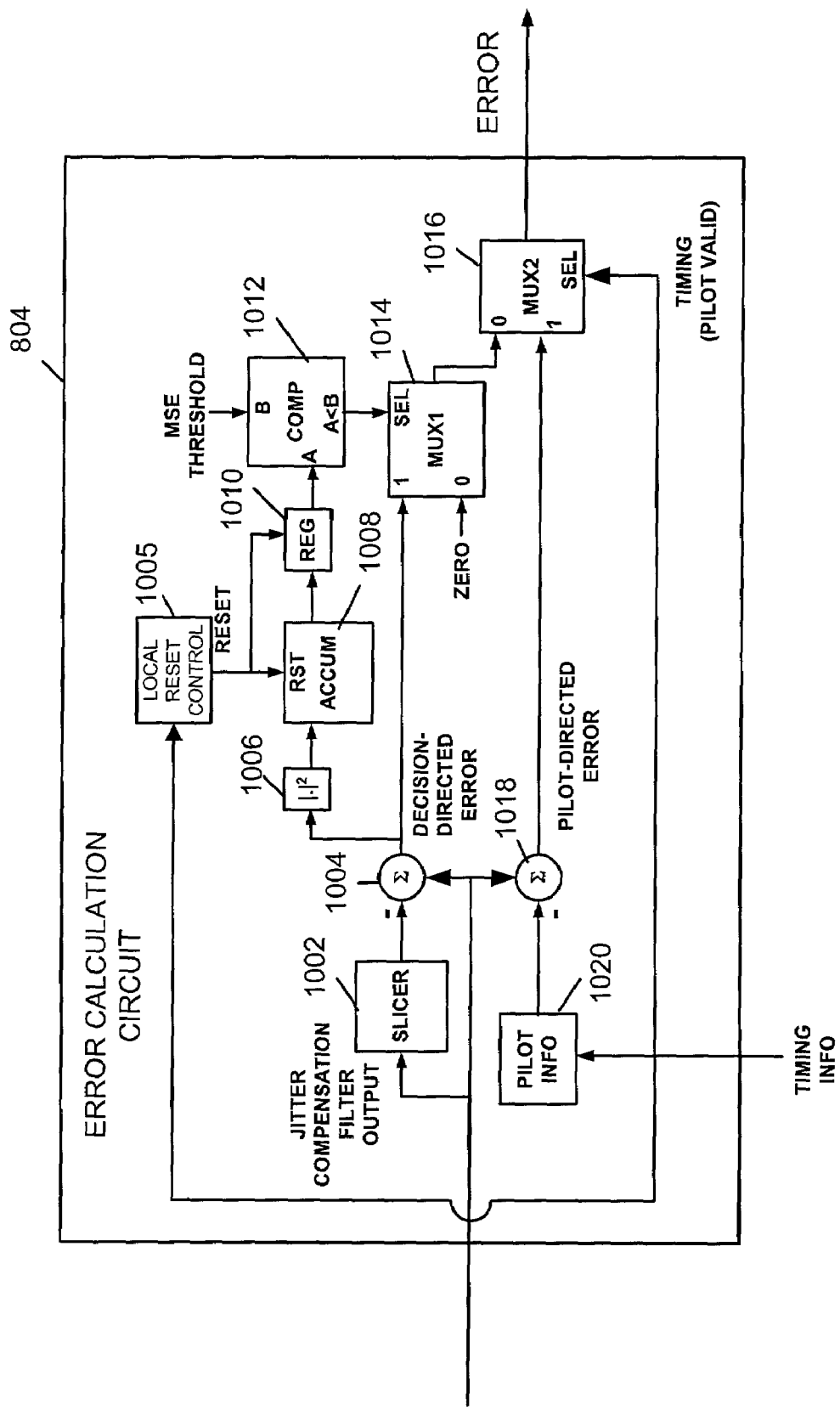
FIGS. 10 and 11 illustrate exemplary error calculation circuits implemented in accordance with different embodiments of the present invention which can be used in the jitter compensation filter of FIG. 8.

A first exemplary error calculation circuit 804 is shown in FIG. 10. The error calculation circuit 804 comprises a slicer 1002, first and second summers 1004, 1018, a squaring circuit 1006, accumulator 1008, register 1010 comparator 1012, first multiplexer 1014, second multiplexer 1016 and a pilot information circuit 1020 which are coupled together as illustrated in FIG. 10.

During operation, an incoming signal, e.g., a block of samples representing symbols output by the jitter compensation filter, is subject to slicing by the slicer 1002. The difference, produced by summer 104 which subtracts the slicer output from an input symbol, produces a decision-directed error. The decision-directed errors, e.g., one per received symbol, output by summer 1004 are squared and then summed by accumulator 1008. The accumulator 1008 produces an average error metric referred to as "MSE" for mean-squared error. At the end of processing the symbols included within the current OFDM block being filtered, the register REG 1010 is clocked to store the resulting MSE value, and the accumulator 1008 is reset to zero to prepare for accumulating in the next iteration. Local reset control 1005 is responsible for generating the accumulator reset signal, e.g., from received timing information.

The first comparator 1012 is used to compare the output value REG of register 1010 to a threshold MSE_THRESHOLD, e.g., a value set at or prior to system implementation. When it is determined that the value REG is below the threshold MSE_THRESHOLD, the signal being filtered is deemed to have converged sufficiently that decision-directed errors may be used beneficially in updating the compensation filter tap weights and the output of the first comparator 1012 is asserted.

The select input of the first multiplexer MUX1 1014 causes the multiplexer to output the decision-directed error supplied to its first input when REG is asserted (1), e.g., the signal being processed has converged sufficiently for the decision directed error to be used reliably. When the value of REG exceeds the MSE_THRESHOLD, indicating a high error rate, the signal being processed is deemed not to have converged sufficiently to the point where decision-directed errors can be used reliably in updating the compensation filter tap weights and the output of the first comparator 1012 will not be asserted (0) causing the first multiplexer 1014 to output the zero supplied to the first multiplexer's second input. In the illustrated embodiment, the multiplexer MUX1 1014 multiplexes a zero error for use on signals with non-pilot carriers in the case where the signal being processed has not sufficiently converged for the decision directed error to be used to update the jitter filter tap values.

Pilot carriers are known carrier values that are often transmitted within an OFDM signal. Since they are known values, a reliable pilot-directed error signal can be formed during the pilot times, e.g., the times at which a pilot symbol is being processed. The pilot values are stored somewhere within the receiver and can be used for error determination purposes when a pilot symbol is being processed. In the FIG. 10 example, a PILOT INFO block 1020, which receives timing information, is shown as storing the pilot value information. However, since pilot information is used in the channel estimation process, that information may alternatively be stored in the channel estimation block 110 and supplied to the error calculation circuit as needed.

The error calculation circuit 804 calculates a pilot directed error by using the second adder 1018 to subtract the pilot symbol value from the received symbol value. The resulting pilot directed error is supplied to the second input of the second multiplexer 1016 while the decision director error (or zero error value) output by the first MUX1 1014 is supplied to the second multiplexer's first input.

In accordance with the exemplary embodiment of the present invention illustrated in FIG. 10, when possible, pilot directed errors are used instead of decision directed errors to generate the error signal used to update the jitter compensation filter tap values. The second multiplexer MUX2 1016 is used to control when a pilot directed error as opposed to a decision directed error will be used to update the jitter compensation filter 706.

The second multiplexer MUX2 1016 is used to control whether the decision directed error output by MUX1 1014 or the pilot directed error generated by summer 1018 is used as the error output signal. The select signal used to determine the output of MUX2 1016 is a pilot valid signal received as part of the timing information. The pilot valid signal indicates a pilot symbol is being processed and thus, when the pilot directed error will be valid and should be used.

When pilot symbols are being processed, the select signal supplied to multiplexer MUX2 1016 will be asserted (1) causing the pilot director error signal to be used as the error calculation circuit's error output signal. However, during other times the select signal will be de-asserted (0) resulting in the output of the first MUX1 1014 being used as the error output signal of the error calculation circuit 804.

As an alternative to declaring zero error when the signal being filtered is noisy and pilot symbols are not being processed, an error signal for the non-pilot tones can be calculated via a non-decision-directed method. Then when the MSE falls below some predefined threshold, e.g., the MSE_THRESHOLD, the decision directed error generated by the non-pilot tones can be used in updating the jitter compensation filter 706.

Figure 11:
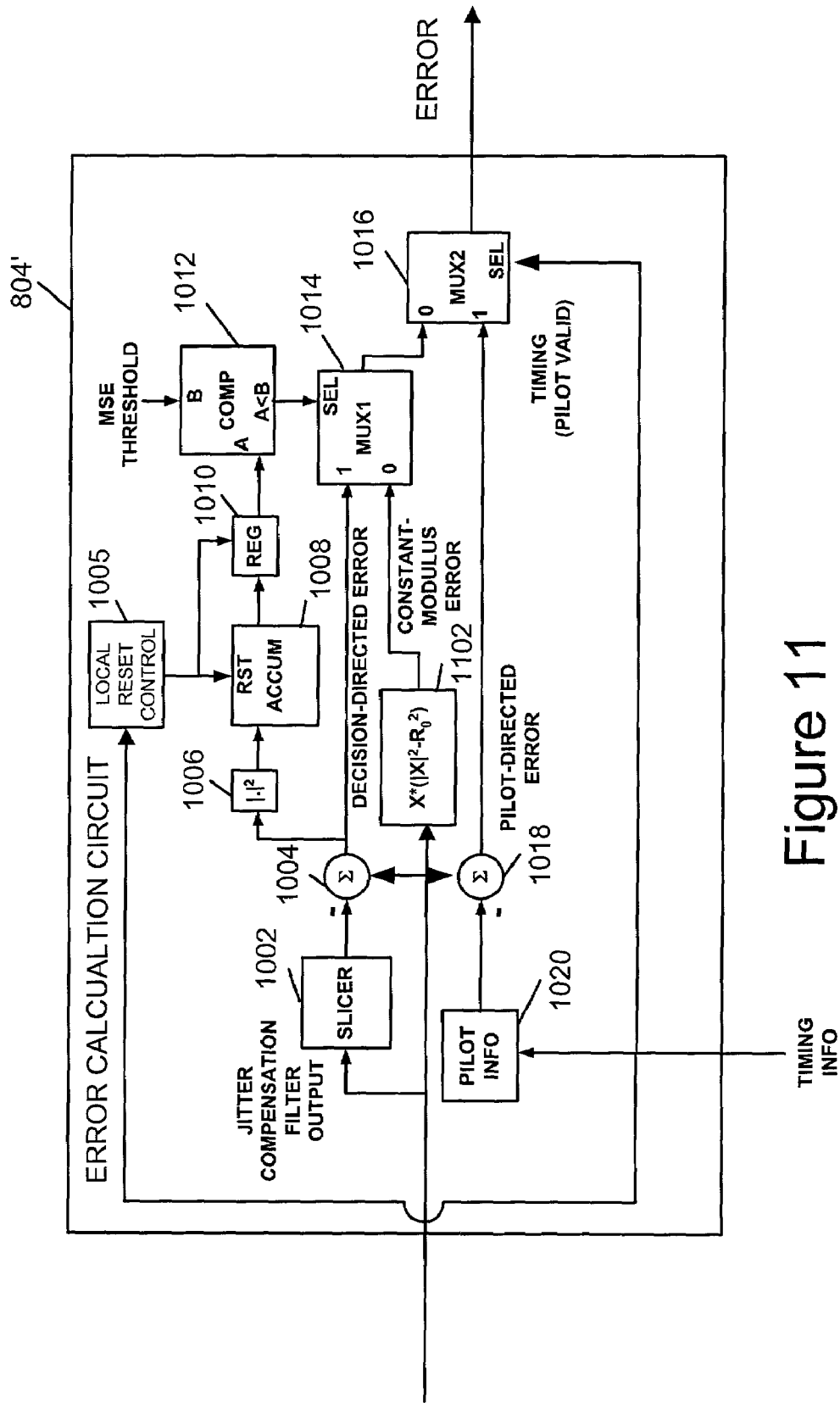

FIG. 11 illustrates a second exemplary error calculation circuit 804' which is similar to the circuit 804 shown in FIG. 10. The FIG. 11 circuit differs from the FIG. 10 circuit in that it uses a non-decision directed error calculation method when the decision directed error and the pilot directed error values are not used.

One non-decision-directed error calculation method is the constant-modulus algorithm, which calculates the error as $$ERR=Z^*(|Z|^2-R_0^2),$$

where the modulus $R_0^2$ is defined as $$R_0^2=<|Z_{SL}|^4>/<|Z_{SL}|^2>,$$

where the averaging denoted by <> is over all of the ideal ("sliced") constellation points $Z_{SL}$.

In the FIG. 11 embodiment, the error calculation circuit 804' includes a constant modulus error generation circuit 1102 which generates a constant modulus error value from the received input but is otherwise similar to the circuit 804. The output of the constant modulus error circuit 1102 is supplied to the second input of the first MUX1 1014 as opposed to a zero which was supplied in the FIG. 10 embodiment. As a result, the constant modulus error signal will be used as the error calculation circuit's output signal when the decision directed error and the pilot directed errors are not used.

In accordance with the present invention, jitter compensation circuit operates at a rate which is faster, e.g., at a clock rate several times the clock rate of the channel compensation circuit and various other OFDM receiver circuits. This allows the same signal, e.g., set or block of values, output by the channel compensation circuit to be processed several times by the jitter compensation circuit 702 before being output, e.g., to subsequent demodulator circuitry.

An alternative to operating the jitter compensation circuit at a clock rate several times the clock rate of the various other OFDM receiver circuits is to utilize parallel hardware: for example, multiple jitter compensation filters and error calculation circuits, such that the output of one circuit feeds into the subsequent circuit. This would introduce overall latency into the system, but reduce the processing speed, i.e., clock rate required.

In order to support reprocessing of the input signal multiple times the jitter compensation circuit includes a buffer 704 for storing the input signal. However, for this purpose, the signal may be stored within the parallel-to-serial converter (106), or possibly an alternate storage location following the channel compensation block.

In accordance with the present invention, each time the signal is run through the jitter compensation filter 706, the compensation filter taps are trained and the output normally becomes more reliable as the filter taps converge to a good solution.

Jitter compensation filter refinement in the above describe manner can, in many cases, make a previously unusable signal usable. Thus, it allows the use of more inexpensive analog components (tuners) having a high amount of phase noise then would otherwise be acceptable.

Figure 12:
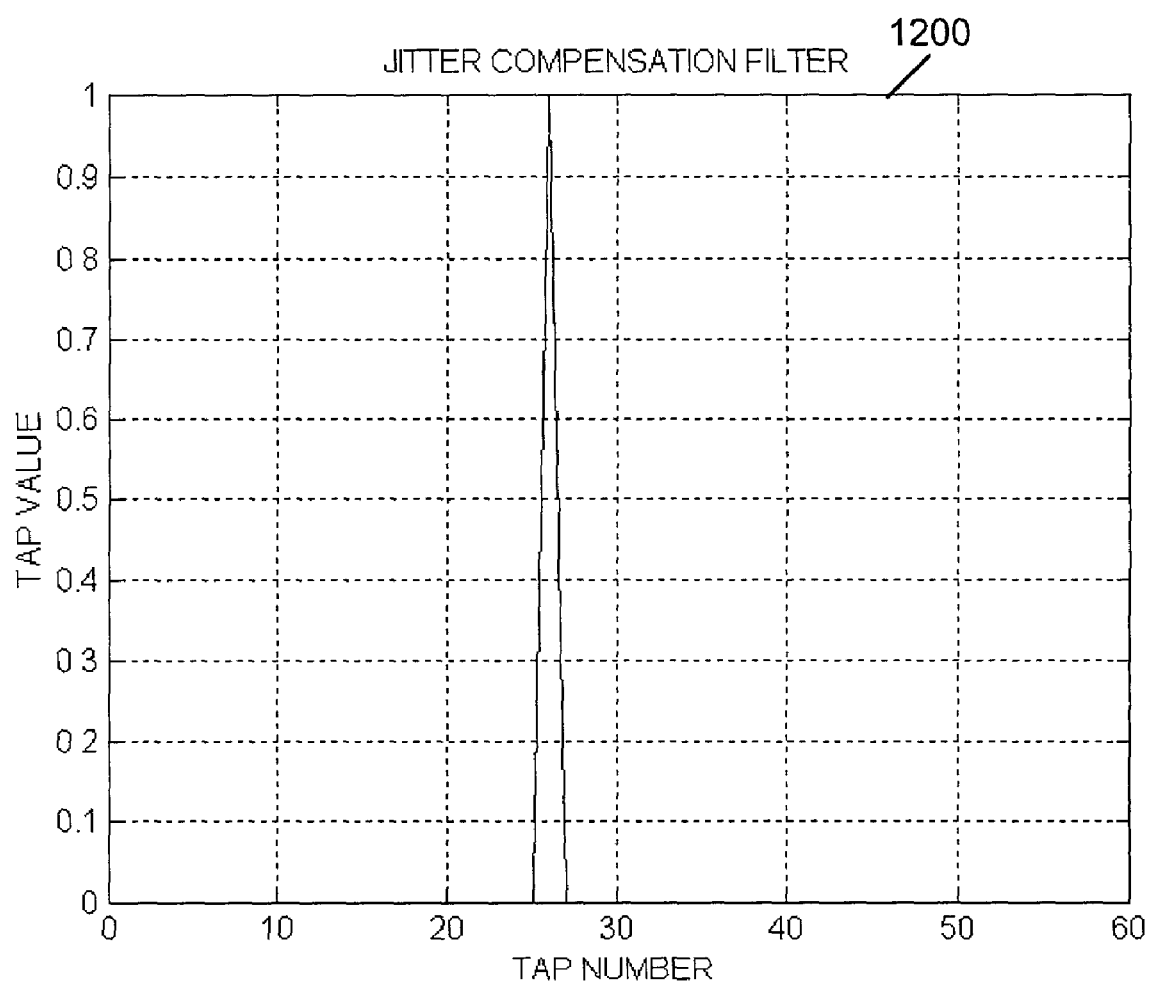
FIG. 12 shows, in the form of a graph, a set of initial jitter compensation filter tap weights used in accordance with one exemplary embodiment of the present invention.

FIG. 12 shows the initial value of taps in an exemplary 51-tap jitter compensation filter. In the FIG. 12 example the 51-tap filter has a center tap initialized to one, and the other taps initialized to zero.

Figure 13:
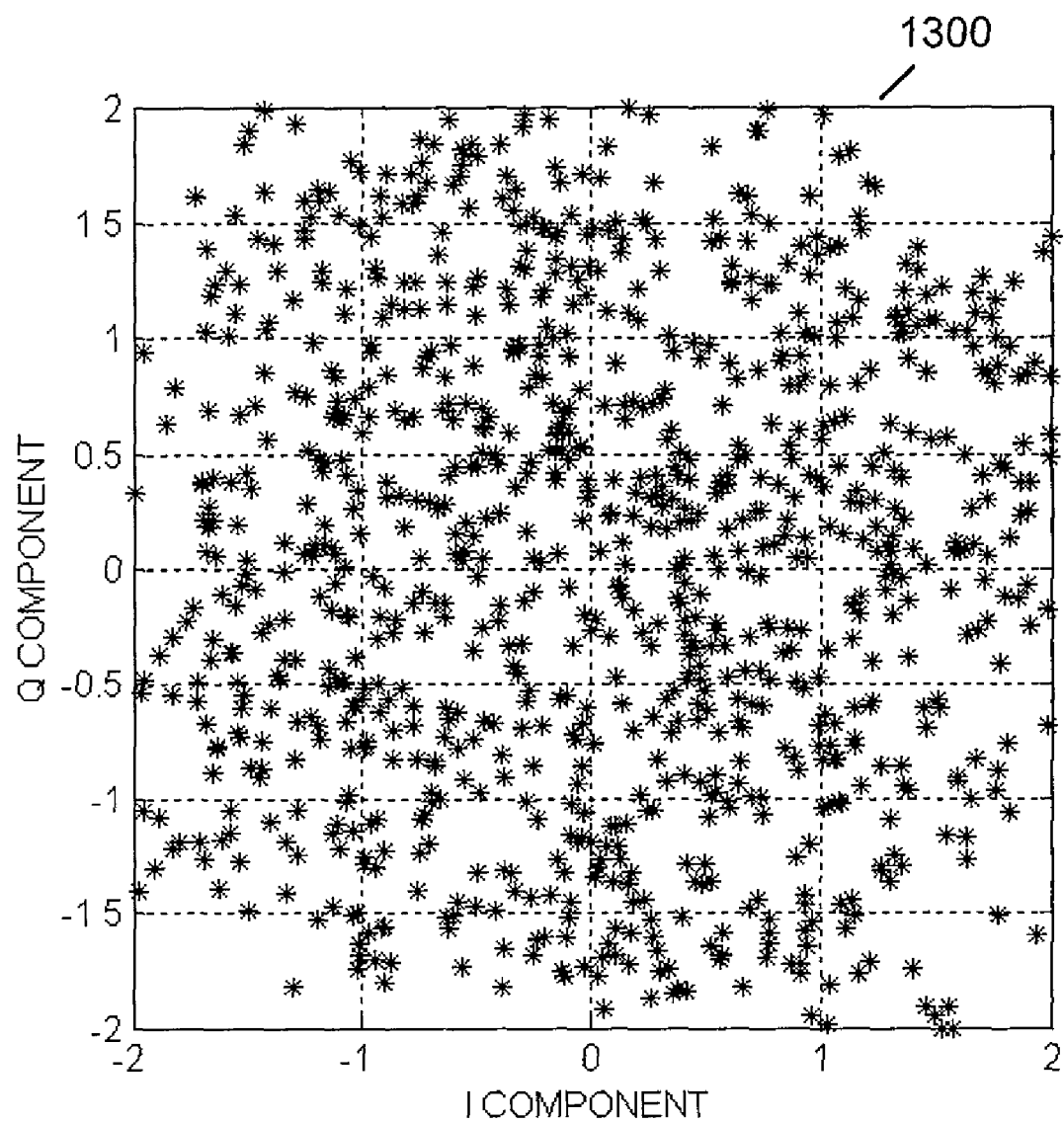
FIG. 13 is an exemplary OFDM output constellation before convergence of the jitter compensation filter tap weights used to filter the block of received samples representing the plotted symbols.

FIG. 13 shows a constellation of 1024 symbols represented by the block of bits, i.e., the signal being processed by the jitter compensation circuitry, after a first pass, that is, without any jitter compensation.

Figure 14:
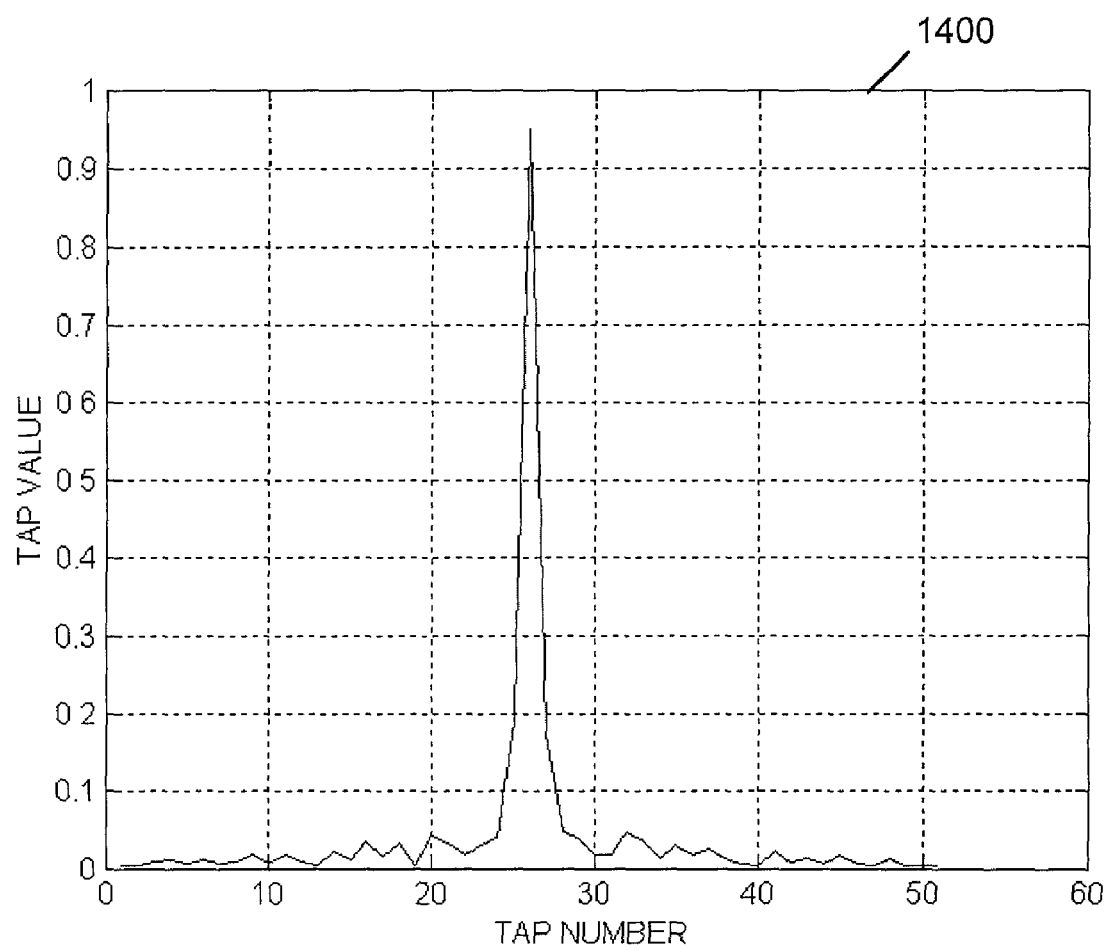
FIG. 14 illustrates a set of jitter compensation tap weights resulting after six iterations of the filter refinement process of the present invention.

FIG. 14 shows a set of filter taps (in absolute value) resulting after six iterations of filter updating in accordance with the present invention.

Figure 15:
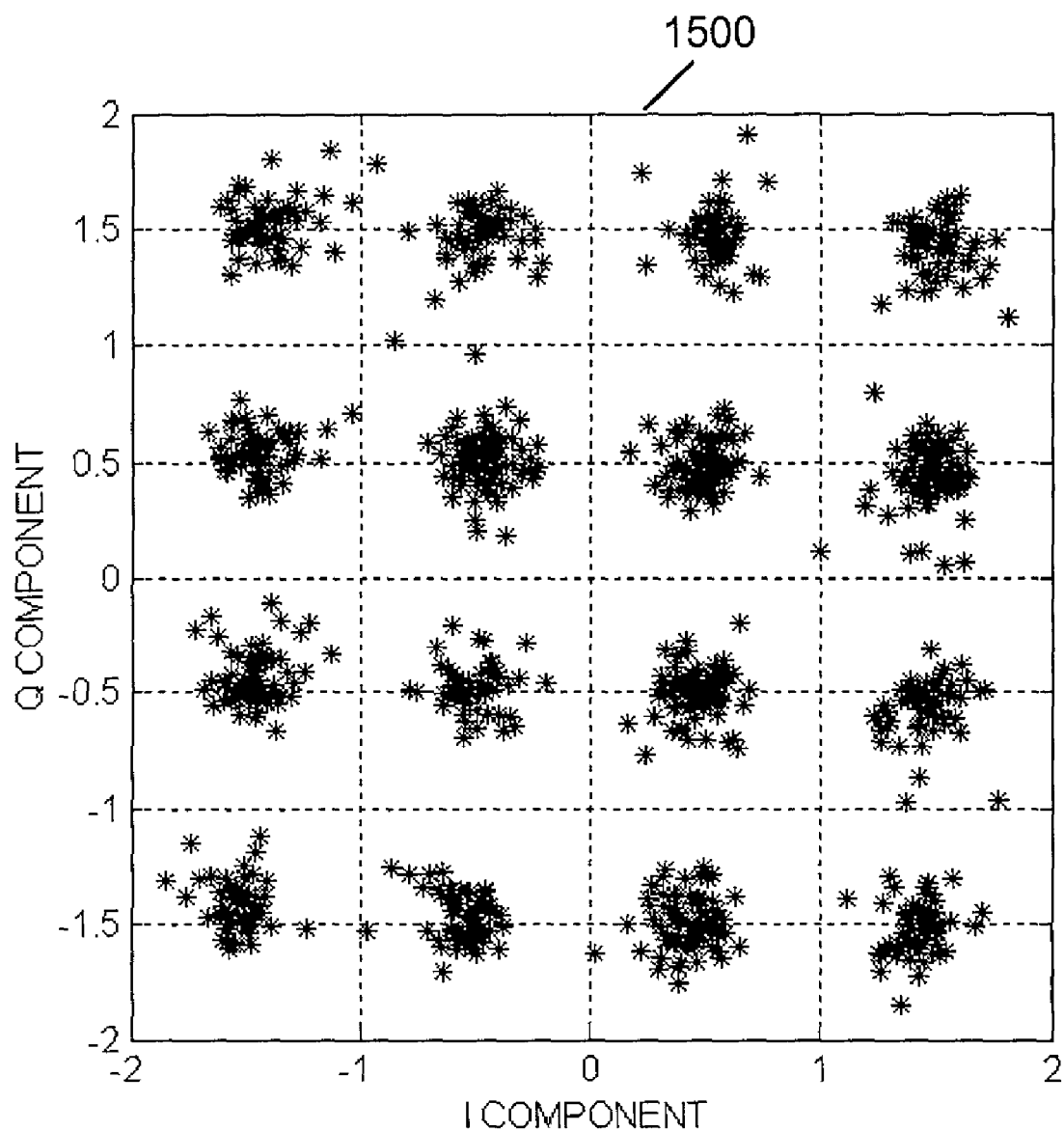
FIG. 15 illustrates an exemplary output of the jitter compensation filter after updating the initial filter tap weights shown in FIG. 12 for a sixth time.

FIG. 15 shows the output of the jitter compensation filter 706 on the same exemplary signal which resulted in the FIG. 13 plot, after the sixth iteration of updating the jitter compensation filter. Note that the 16-QAM constellation points carried over the each of the OFDM carriers are now clearly distinguishable, and hence the previously unrecoverable data is now recoverable as a result of the jitter compensation filtering of the present invention.

The methods and apparatus of the present invention have been described in the context of an OFDM receiver application which may be used, e.g., for wireless local area networks, multi-channel multipoint distribution systems (MMDS), or terrestrial broadcast purposes, in order to allow inexpensive tuners, having otherwise excessive phase noise, to be used. While described in an OFDM embodiment, the methods and apparatus of the present invention are not limited to OFDM applications and can be used in other types of receivers which process multi-tone signals. Furthermore, while described in terms of circuits, the elements which make up the apparatus of the present invention can be implemented as software modules which can be used to control a programmable processor to perform the described signal processing operations. Accordingly, the present invention encompasses software as well as circuitry for implementing the above described methods.

What is claimed is:

1. An apparatus for processing a signal used to communicate a block of data representing at least one symbol, the apparatus comprising:
   a Fourier transform circuit for performing at least one Fourier transform on said signal;
   a buffer coupled to said Fourier transform circuit for buffering data produced from an output of said Fourier transform circuit;
   a jitter compensation filter coupled to said buffer for performing a filtering operation on data obtained from said buffer corresponding to said block of data to generate a filtered block of data, the jitter compensation filter having an update input for receiving a filter coefficient update signal;
   an error calculation module coupled to the update input of the jitter compensation filter, the error calculation module generating the filter coefficient update signal from at least one signal error estimate made from the filtered block of data output by the jitter compensation filter; and
   a control circuit coupled to said error calculation module for determining as a function of said at least one signal error estimate, when to output said filtered block of data.

2. The apparatus of claim 1, further comprising:
   a channel compensation circuit for receiving said block of data and performing a channel compensation operation on at least a portion of said block of data prior to the block of data being stored in said buffer for processing by said jitter compensation filter.

3. The apparatus of claim 2, wherein said block of data represents a plurality of symbols, the apparatus further comprising:
   demodulator circuitry coupled to an output of the jitter compensation filter.

4. The apparatus of claim 1, wherein the error calculation module includes:
   means for generating a decision directed error value.

5. An apparatus for processing a signal used to communicate a block of data representing at least one symbol, the apparatus comprising:
   a Fourier transform circuit for performing at least one Fourier transform on said signal;
   a buffer coupled to said Fourier transform circuit for buffering data produced from an output of said Fourier transform circuit;
   a jitter compensation filter coupled to said buffer for performing a filtering operation on data obtained from said buffer corresponding to said block of data to generate a filtered block of data, the jitter compensation filter having an update input for receiving a filter coefficient update signal; and
   an error calculation module coupled to the update input of the jitter compensation filter, the error calculation module generating the filter coefficient update signal from at least one signal error estimate made from the filtered block of data output by the jitter compensation filter, wherein the error calculation module includes:
   means for generating a decision directed error value;
   means for generating a pilot directed error value; and
   a selection device for selecting one of the decision directed error value and the pilot directed error value to be output.

6. An apparatus for processing a signal used to communicate a block of data representing at least one symbol, the apparatus comprising:

a Fourier transform circuit for performing at least one Fourier transform on a said signal;
a buffer coupled to said Fourier transform circuit for buffering data produced from an output of said Fourier transform circuit;
a jitter compensation filter coupled to said buffer for performing a filtering operation on data obtained from said buffer corresponding to said block of data to generate a filtered block of data, the jitter compensation filter having an update input for receiving a filter coefficient update signal; and
an error calculation module coupled to the update input of the jitter compensation filter, the error calculation module generating the filter coefficient update signal from at least one signal error estimate made from the filtered block of data output by the jitter compensation filter, wherein the error calculation module includes:
means for generating a decision directed error value;
means for generating a non-decision directed error value; and
a selection device for selecting one of the decision directed error value and the non-decision directed error value to be output.

7. The apparatus of claim 6, further comprising:
an input buffer coupled to the jitter compensation filter for storing said block of data while being processed multiple times by said jitter compensation filter.

8. An apparatus for processing a signal used to communicate a block of data representing at least one symbol, the apparatus comprising:
a Fourier transform circuit for performing at least one Fourier transform on said signal;
a buffer coupled to said Fourier transform circuit for buffering data produced from an output of said Fourier transform circuit;
a jitter compensation filter coupled to said buffer for performing a filtering operation on data obtained from said buffer corresponding to said block of data to generate a filtered block of data, the jitter compensation filter having an update input for receiving a filter coefficient update signal, said buffer storing said block of data while said block of data is processed multiple times by said jitter compensation filter;
an error calculation module coupled to the update input of the jitter compensation filter, the error calculation module generating the filter coefficient update signal from at least one signal error estimate made from the filtered block of data output by the jitter compensation filter; and
an output control device for determining when to output the filtered block of data generated by said jitter compensation filter.

9. The apparatus of claim 8, wherein the output control device includes:
means for determining when said block of data has been filtered a fixed number of times by the jitter compensation filter.

10. The apparatus of claim 8,
wherein the output control device includes an input for receiving the filter coefficient update signal generated by said error calculation module; and
wherein the jitter compensation filter further includes means for resetting filter coefficient values to a set of initial values in response to a reset signal generated by said output control device.

11. A system for processing a multi-tone signal, the system including:
a Fourier transform circuit for performing at least one Fourier transform on said multi-tone signal;
a channel compensation module coupled to said Fourier transform circuit for performing a channel compensation operation on said multi-tone signal after processing by said Fourier transform circuit;
a buffer coupled to said Fourier transform circuit for buffering the channel compensated multi-tone signal;
a jitter compensation module coupled to said buffer for performing a jitter reduction operation on the buffered channel compensated multi-tone signal, wherein the jitter compensation module includes: a jitter compensation filter with programmable filter tap weights, and means for iteratively updating the filter tap weights as a function of the jitter compensation filter output; and
a control circuit for determining when the output of the jitter compensation filter should be used as the output of the jitter compensation module.

12. The system of claim 11, wherein the means for iteratively updating the filter tap weights includes:
a signal error estimation circuit for generating from the output of the jitter compensation filter a measure of a symbol error.

13. A system for processing a multi-tone signal, the system including:
a Fourier transform circuit for performing at least one Fourier transform on said multi-tone signal; a channel compensation module coupled to said Fourier transform circuit for performing a channel compensation operation on said multi-tone signal after processing by said Fourier transform circuit;
a buffer coupled to said Fourier transform circuit for buffering the channel compensated multi-tone signal;
a jitter compensation module coupled to said buffer for performing a jitter reduction operation on the buffered channel compensated multi-tone signal, wherein the jitter compensation module includes: a jitter compensation filter with programmable filter tap weights, and means for iteratively updating the filter tap weights as a function of the jitter compensation filter output, wherein the means for iteratively updating the filter tap weights includes a signal error estimation circuit for generating from the output of the jitter compensation filter a measure of a symbol error; and
means for resetting the jitter compensation filter tap weights to an initial set of values in response to the control circuit determining that the output of the jitter compensation filter should be used as the output of the jitter compensation filter.

14. A method of processing a multi-tone signal, the method comprising the steps of:
performing a Fourier transform operation on the multi-tone signal;
buffering a block of samples produced from the output of said Fourier transform operation; and
performing a jitter compensation operation, said jitter compensation operation including:
i) operating a filter having a plurality of tap weights to filter said block of samples to produce a filtered block of data;
ii) determining a signal error from the filtered block of data;
iii) updating at least one of said plurality of tap weights in said filter as a function of the determined signal error; and
iv) repeating steps i, ii, and iii until a filter updating stop criterion is satisfied.

15. The method of claim 14, further comprising the step of:
supplying the filtered block of data output by said filter when said filter updating criterion is satisfied to subsequent receiver circuitry.

16. The method of claim 14, wherein said filter updating stop criterion is the completion of a fixed number of filtering operations on said block of data.

17. The method of claim 16, wherein said filter updating criterion is a failure in the signal error to exhibit an improvement over the previous signal error.

18. The method of claim 14, wherein said step of determining a signal error includes generating a decision directed error value.

19. The method of claim 14, wherein said step of determining a signal error includes generating a non-decision directed error value.

20. The method of claim 14, further comprising:
prior to performing said buffering, performing a channel compensation operation on said block of data.

21. The method of claim 20, a single channel compensation operation is performed on the block of data in a first period of time; and
step i, ii and iii are performed multiple times in a time period which is equal to or shorter than the first time period.

* * * * *